US012803287B2

(12) United States Patent
Simpson

(10) Patent No.: US 12,803,287 B2
(45) Date of Patent: Nov. 17, 2026

(54) SYSTEM AND METHOD FOR MAINTAINING STABLE OPERATIONS ON A DC GRID ARCHITECTURE

(71) Applicant: AES Clean Energy Services, LLC, Salt Lake City, UT (US)

(72) Inventor: Michael Simpson, Centennial, CO (US)

(73) Assignee: AES Clean Energy Services, LLC, Salt Lake City, UT (US)

( * ) Notice: Subject to any disclaimer, the term of this patent is extended or adjusted under 35 U.S.C. 154(b) by 0 days.

(21) Appl. No.: 19/013,912

(22) Filed: Jan. 8, 2025

(65) Prior Publication Data

US 2025/0226664 A1 Jul. 10, 2025

Related U.S. Application Data

(60) Provisional application No. 63/618,572, filed on Jan. 8, 2024.

(51) Int. Cl.
*B60L 55/00* (2019.01)
*B60L 53/51* (2019.01)
(Continued)

(52) U.S. Cl.
CPC ................ *H02J 3/34* (2013.01); *B60L 53/51* (2019.02); *B60L 53/53* (2019.02); *B60L 53/63* (2019.02);
(Continued)

(58) Field of Classification Search
CPC ........ H02J 3/34; H02J 3/32; H02J 3/38; H02J 7/00712; H02J 7/35; H02J 2300/24;
(Continued)

(56) References Cited

U.S. PATENT DOCUMENTS 11,309,708 B2 4/2022 Ley et al.
2023/0182615 A1* 6/2023 Pizzurro ................ B60L 53/18 320/109

(Continued)

OTHER PUBLICATIONS

Garcia-Trivino, Pablo, et al. "Control of electric vehicles fast charging station supplied by PV/energy storage system/grid." 2016 IEEE International Energy Conference (ENERGYCON). IEEE, 2016.

(Continued)

*Primary Examiner* — Menatoallah Youssef
*Assistant Examiner* — Esayas G Yeshaw
(74) *Attorney, Agent, or Firm* — Lempia Summerfield Katz LLC

(57) ABSTRACT

A direct current (DC) power system electrically connected to an alternating current (AC) grid and method are disclosed. One or more renewable generation or storage systems and one or more electrical charging stations may connect to a DC bus. The DC power system and method are configured to maintain stable operations on the DC bus, such as by distributed an automated control. In particular, distributed control may be implemented with the renewable generation systems (such as the PV systems) the storage systems (such as the battery systems), and within the electrical charging stations. This distributed control may work in combination with a centralized control so that the distributed control may
(Continued)

control, in the short-term or in real-time, the power to or from the DC bus, whereas the central control may control thereafter.

19 Claims, 12 Drawing Sheets

(51) Int. Cl.

| | |
|---|---|
| ***B60L 53/53*** | (2019.01) |
| ***B60L 53/63*** | (2019.01) |
| ***B60L 53/67*** | (2019.01) |
| ***H02J 3/32*** | (2006.01) |
| ***H02J 3/34*** | (2006.01) |
| ***H02J 3/38*** | (2006.01) |
| ***H02J 7/35*** | (2006.01) |
| ***H02J 7/90*** | (2026.01) |
| *H02J 101/24* | (2026.01) |

(52) U.S. Cl.
CPC ................ *B60L 53/67* (2019.02); *H02J 3/32* (2013.01); *H02J 3/38* (2013.01); *H02J 7/35* (2013.01); *H02J 7/933* (2026.01); *B60L 2210/10* (2013.01); *B60L 2210/40* (2013.01); *H02J 2101/24* (2026.01)

(58) Field of Classification Search
CPC .......... B60L 53/51; B60L 53/53; B60L 53/63; B60L 53/67; B60L 2210/10; B60L 2210/40
See application file for complete search history.

(56) References Cited

U.S. PATENT DOCUMENTS

| | | | | |
|---|---|---|---|---|
| 2023/0356607 | A1* | 11/2023 | McAlwee | B60L 53/57 |
| 2024/0195175 | A1* | 6/2024 | Shahriar | H02J 3/322 |
| 2025/0266693 | A1* | 8/2025 | Bijlenga | H02J 7/0016 |

OTHER PUBLICATIONS

Hosseinipour, Ali, and Hossein Hojabri. "Virtual inertia control of PV systems for dynamic performance and damping enhancement of DC microgrids with constant power loads." IET Renewable Power Generation 12.4 (2018): 430-438.
International Search Report for International Application No. PCT/US2025/010669 mailed on Jun. 2, 2025.
Written Opinion for International Application No. PCT/US2025/010669 mailed on Jun. 2, 2025.

* cited by examiner

310

| Common Bus (V) | BESS 3rd Order Dispatch | PV Linear Dispatch |
|---|---|---|
| 1410 | 100% | 100% |
| 1415 | 83% | 93% |
| 1420 | 67% | 86% |
| 1425 | 50% | 79% |
| 1430 | 33% | 71% |
| 1435 | 17% | 64% |
| 1440 | 0% | 57% |
| 1445 | 0% | 50% |
| 1450 | 0% | 43% |
| 1455 | -17% | 36% |
| 1460 | -33% | 29% |
| 1465 | -50% | 21% |
| 1470 | -67% | 14% |
| 1475 | -83% | 7% |
| 1480 | -100% | 0% |
| 1485 | -100% | 0% |
| 1490 | -100% | 0% |
| | | |
| 1445 | -100% | |
| 1445 | 100% | |

FIG. 3B

320

| | | |
|---|---|---|
| BESS | Vnom | 1445 V |
| | Vmin | 1410 V |
| | Vmax | 1480 V |
| | | |
| PV | Vmin | 1410 V |
| | droop_PV | -1.4% % |
| | Vmax | 1480 V |
| | | |
| | Vref_droop_BESS | 1445 V |
| | droop_dch | -3.3% % |
| | droop_ch | -3.3% % |
| | dispatch_nominal | 0 % |
| | deadband | 5 V |

FIG. 3C

330

Test Conditions

| PV | BESS Dispatch | Vmaster | Vref_droop_BESS |
|---|---|---|---|
| 100% | 0% | 1410 | 1410 |
| 100% | -100% | 1410 | 1375 |
| 50% | 50% | 1445 | 1465 |
| 50% | 0% | 1445 | 1445 |
| 50% | -100% | 1445 | 1410 |
| 0% | 0% | 1480 | 1480 |
| 0% | 100% | 1480 | 1515 |
| 0% | -50% | 1480 | 1460 |

FIG. 3D

340

| | | |
|---|---|---|
| time to balance | 4 | hr |
| f_balance | 0.25 | %deltaSOC/hr |

SOC Proportional Dispatch

| String SOC | Droop Shift |
|---|---|
| 50% | 0.45% |
| 50% | 0.45% |
| 55% | -0.80% |
| 60% | -2.05% |
| 48% | 0.95% |
| 50% | 0.45% |
| 50% | 0.45% |
| 50% | 0.45% |
| 46% | 1.45% |
| 59% | -1.80% |
| sum | 0.00% |

*Solve for same net dispatch when proportional*
dispatch implies >100% discharge or ≤100% charge

FIG. 3E

SYSTEM AND METHOD FOR MAINTAINING STABLE OPERATIONS ON A DC GRID ARCHITECTURE

REFERENCE TO RELATED APPLICATION

This application claims priority to U.S. Provisional Application Ser. No. 63/618,572 filed Jan. 8, 2024, the entire disclosure of which is hereby incorporated by reference herein.

FIELD OF THE INVENTION

The present application relates generally to a DC grid architecture. Specifically, the disclosure relates to maintaining stable operations of a DC grid architecture that distributes one or both of renewable generation for storage or consumption.

BACKGROUND OF THE INVENTION

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Various grids, whether utility grids or microgrids, may combine energy storage components and renewable energy sources. One way to accomplish this is to operate the AC grid in combination with a DC-coupled architecture wherein the energy storage components and renewable energy sources are each connected to a DC bus via DC-DC converters. Further, the DC bus is connected to the AC grid via a DC-AC converter (such as a power inverter), as disclosed in U.S. Pat. No. 11,309,708, incorporated by reference herein in its entirety.

SUMMARY

In one or some embodiments, a direct current (DC) power system electrically connected to an alternating current (AC) grid is disclosed. The DC power system includes: a common DC bus; DC renewable power generation system electrically connected to the common DC bus; DC energy storage system electrically connected to the DC power bus and configured to store energy provided by the DC renewable power generation system to the common DC bus; a converter electrically connected to the common DC bus, the converter configured to convert DC power from the common DC bus to AC power for the AC grid; DC renewable power generation control electronics associated with the DC renewable power generation system; and DC energy storage control electronics associated with the DC energy storage system. The DC renewable power generation control electronics configured to: sense at least one deviation of at least one of power, current, or voltage of the common DC bus; and responsive to sensing the at least one deviation of the at least one of power, current, or voltage of the common DC bus, independently and without communicating with external control electronics, control in real-time power from the DC renewable power generation system in order to reduce the at least one deviation of the common DC bus. The DC energy storage control electronics associated with the DC energy storage system is configured to: sense the at least one deviation of at least one of power, current, or voltage of the common DC bus; and responsive to sensing the at least one deviation of the at least one of power, current, or voltage of the common DC bus, independently and without communicating with external control electronics, control in real-time the power to or from the DC energy storage system in order to reduce the at least one deviation of the common DC bus.

BRIEF DESCRIPTION OF THE DRAWINGS

The present application is further described in the detailed description which follows, in reference to the noted plurality of drawings by way of non-limiting examples of exemplary implementations, in which like reference numerals represent similar parts throughout the several views of the drawings. In this regard, the appended drawings illustrate only exemplary implementations and are therefore not to be considered limiting of scope, for the disclosure may admit to other equally effective embodiments and applications.

FIGS. 3B-E are various tables associated with parameters for the droop curve illustrated in FIG. 3A.

DETAILED DESCRIPTION OF THE INVENTION

Figure 1A:
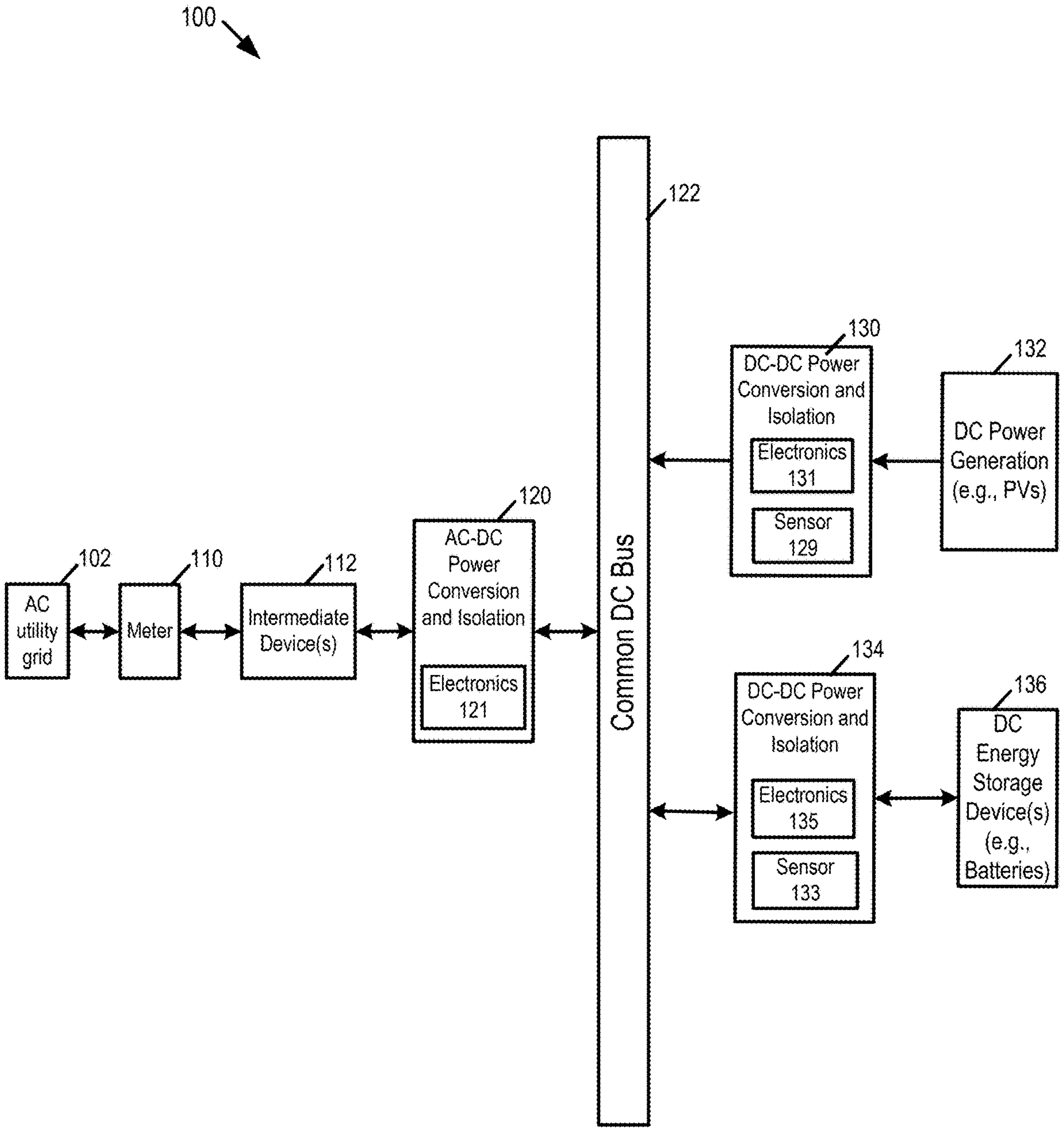
FIG. 1A is a block diagram illustrating a grid-connected DC architecture using a common DC bus, DC power generation, and DC energy storage device(s).

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, terms such as "continual" and "continuous" generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process.

If there is any conflict in the usages of a word or term in this specification and one or more patent or other documents that may be incorporated herein by reference, the definitions that are consistent with this specification should be adopted for the purposes of understanding this disclosure.

A utility grid (interchangeably termed a grid, a power grid, or an AC grid) may comprise generator(s); transmission lines; and distribution network(s). The generators may generate electricity in a variety of ways, such as using coal- and natural gas-burning power plants, hydroelectric dams, nuclear power plants, wind turbines, and solar panels. The generated electricity may be stepped up to high voltage (e.g., at least 110 kV) and carried using the transmission lines. In between the transmission lines and the end consumers (interchangeably termed end load, consumer users, or consumer site) are the distribution networks that include step-down transformers and substations and end with meters at the end consumers (e.g., homes, schools, businesses, etc.).

The AC grid, as discussed in the background, may be coupled to a DC bus via a power inverter in which the DC bus may supply energy to the AC grid. One focus may be to ensure stability on the AC grid, such as disclosed in U.S. Pat. No. 11,309,708. A separate focus may be to ensure stability on at least a part of the DC-coupled architecture, such as on the stability of the DC bus. For example, the DC-coupled architecture, which may be at least partly reliant on power supplied by the AC grid, may power one or more systems (e.g., one or more electric vehicle charging stations, as discussed further below).

Various events may destabilize the DC-coupled architecture, such as the DC bus. As one example, instability of the AC grid may result in DC bus instability. As another example, changes in the power suppled to and/or withdrawn from the DC bus may likewise result in DC bus instability, examples of which may include: (i) faults in one or both of the energy storage components or the renewable energy sources; or (ii) commands from a third party to charge the energy storage components (e.g., recharge electric vehicles connected to electric vehicle charging stations) or export the power generated by the renewable energy sources. Regardless of the cause, DC bus instability may cause problems in the DC-coupled architecture, and in turn, may cause a cascading problem to at least a part of the AC grid connected thereto.

In one or some embodiments, the DC-coupled architecture may include one or more energy storage components connected to the DC bus via a DC-DC converter (interchangeably termed DC-DC converter electronics). Likewise, the DC-coupled architecture may include one or more renewable energy sources connected to the DC bus via a DC-DC converter. Instability of the DC bus may occur when one of the DC-DC converters pushes more power to or pulls more power from the DC bus than it is rated to do.

As such, in one or some embodiments, a method and system are disclosed that are configured to improve stability of the DC bus. In one or some embodiments, the method and system may comprise a distributed intelligence system in which different sections of the DC architecture, such as any one, any some, or all of the DC-DC converters include control intelligence located therein or associated therewith in order to autonomously respond to a sensed instability in the DC bus and correct accordingly. In one or some embodiments, the autonomous response by the distributed intelligence may be performed without communication with any other control devices so that the sensed instability may be corrected more quickly and without reliance on communication with any another electronic devices. Thus, the distributed intelligence may operate in real time to stabilize the DC bus.

In one or some embodiments, separate from the distributed intelligence, control of the DC bus may be based on communication between different devices (such as between DC-DC converters) that may result in correction of instability in the DC bus on a slower timescale than that performed by the distributed intelligence. In this way, the intelligence may be any one, any combination, or all of: one or both of distributed or centralized; one or both of independent of communication with another device or dependent on communication with another device; or one or both of performed in real time or on a slower timescale.

Thus, in one or some embodiments, the distributed intelligence may perform both of: (i) sensing the instability on the DC bus; and (ii) using rule, algorithms, or the like to automatically control operations to more stabilize the DC bus. Various rules, algorithms, or the like are contemplated.

In one or some embodiments, the rules or algorithms may be embodied in droop curves that may be used to automatically control operations to more stabilize the DC bus. Droop curves may be characterized by one or more aspects, such as any one, any combination, or all of: specific values in the curves; slope of the curve; or deadband within the curve (e.g., section of the curve in which droop curve indicates no change in operation). Further, the droop curves may be tailored to different parts of the DC architecture. For example, a first droop curve may be tailored to the DC-DC converter assigned to the energy storage components and a second droop curve may be tailored to the DC-DC converter assigned to the renewable energy sources. More specifically, in the instance where multiple types of renewable energy sources are used (e.g., photovoltaic and wind power), respective tailored droop curves may be assigned to each of the multiple types.

In one or some embodiments, one or more droop curves may be accessible by various devices within the system, such as in the control electronics within different parts of the system. In one or some embodiments, the determination as to which of the available droop curves to access and use may be independently determined by the respective device accessing and using the droop curves. Alternatively, a central controller may determine which, of the plurality of droop curves that are available for access and use, to access and use.

In one or some embodiments, droop curves may be updated, such as periodically updated. Alternatively, or in addition, interpretation or use of the droop curves may be modified. For example, the droop curves may be updated or interpreted differently in one or several ways. In one particular example, the droop curves themselves may be modified by adjusting part or all of the droop curves. In another particular example, interpretation of the droop curves may be modified, such as by adjusting the reference voltage.

Various triggers may result in modification and/or different interpretation of the droop curves. One trigger may relate to the supplied power. As one example, the power supplied may vary, such as due to the PVs reducing or increasing the power output due to the presence of a cloudy day or a sunny day. As another example, the power supplied may vary due to costs, such as the cost of the power supplied by the AC grid being higher at a certain time of the day and being lower at another time of the day.

Alternatively, or in addition, another trigger may relate to the consumed power. As discussed above, the DC architecture may supply power to power-consuming devices, such as supplying power to recharge electric vehicles. The amount of power supplied may vary depending on whether a respective electric vehicle is plugged into a charging station (resulting in an increase in the request to the DC architecture to supply power) and/or whether a respective electric vehicle is unplugged from a charging station (resulting in a decrease in the request to the DC architecture to supply power). Further, the DC architecture may supply power to the AC grid, with the power supplied to the AC grid being adjusted periodically. In this regard, the amount of power supplied by the DC architecture may vary as well. Thus, the implementation of the droop curves (e.g., via modification and/or different interpretation) may vary dependent on one or more factors, such as any one, any combination, or all of: the number of active charging stations; the amount of power drawn by the electric vehicles plugged into the active charging stations (e.g., a first electric vehicle may draw more power from a first electric vehicle charging station to recharge than a second electric vehicle that draws less power from a second electric vehicle charging station to recharge); the amount of power generated by PVs or other renewables (e.g., the amount of power currently being generated by PVs or predicted to be generated at a predetermined future time by the PVs); the amount of power stored (e.g., a current amount of power stored in the batteries); the amount of power available from the grid (e.g., available in terms of being available regardless of price; or available in terms of being priced less than a predetermined price/kW); or the amount of power supplied to the grid. Thus, the DC architecture may dynamically implement the droop curves (e.g., via modification and/or different interpretation) dependent on various changes within the system.

In one or some embodiments, the central controller may determine the modification(s) and/or adjustment(s) (e.g., adjusting a reference voltage), and may communicate the modification(s) and/or adjustment(s) to one, some or all of the other control electronics within the different parts of the system (e.g., the central control may communicate the adjusted reference voltage to one, some, or all of the control electronics within the system). In this regard, the updated and/or re-interpreted droop curves may reside within or be re-interpreted within at least one electronic device, such as an electronic device within the DC architecture. Alternatively, the updated and/or reinterpreted droop curves may reside within or be re-interpreted within an electronic device external to the DC architecture. As one example, a server may access the updated droop curves and may further be triggered to push the updated droop curves to any one, some, or all of the electronic devices within the DC architecture.

Referring to the figures, FIG. 1A is a block diagram 100 illustrating a grid-connected DC architecture using a common DC bus 122, DC power generation 132, and DC energy storage device 136. For example, FIG. 1A illustrates AC utility grid 102 and meter 110. AC utility grid 102 may be any part of an electric grid, such as any one, any combination, or all of: generator(s) (e.g., that generate electricity); step-up transformers to increase the voltage output from the generators to a transmission voltage; transmission lines; step-down transformers to step down the voltage to distribution; and distribution to the ultimate consumer (e.g., to connect to different meter(s)).

The meter 110 (interchangeable termed an electricity meter) may comprise a device that measures the amount of electric energy consumed by a site, such as a residence, a business, or the like. For example, for larger loads (e.g., more than about 200 ampere of load), current transformers may be used, so that the meter may be located somewhere other than in line with the service conductors. Thus, various grid connections are contemplated, which may comprise installation of the grid-connected electric vehicle charging station system by one or both of: (i) modifications being limited to being behind-the-meter; or (ii) installing a meter at the site.

Various types of DC power generation 132 are contemplated, such as any one, any combination, or all of: a plurality of solar panels (such as photovoltaics (PVs)); wind power; geothermal; or the like. As discussed in more detail below, in one or some embodiments, the solar panels may be arranged or grouped in different groupings, with each grouping being separately electrically connected to the common DC bus 122. See FIG. 2C. Various solar panels (interchangeably termed solar cell panel, solar electric panel, photovoltaic (PV) module or PV panel) are contemplated. In one or some embodiments, the solar panel comprises an assembly of photovoltaic solar cells mounted in a frame, such as a rectangular frame. The solar panel may capture sunlight as a source of radiant energy, which may then be converted into electric energy in the form of DC electricity.

Likewise, various types of DC energy storage device 136 are contemplated. As one example, batteries may comprise a type of DC energy storage device 136. In particular, a device using batteries may comprise a battery energy storage system (BESS), which may comprise one or more batteries that store electrical energy for use at a later time. As discussed in more detail below, in one or some embodiments, the batteries may be arranged or grouped in different groupings, with each grouping being separately electrically connected to the common DC bus 122. See FIG. 2C Further, as shown in FIG. 1A, block diagram includes a common DC bus 122, in which any one, any combination, or all of the following may be connected thereto: the AC utility grid 102 (via meter 110 and AC-DC power conversion and isolation 120); DC power generation 132 (via DC-DC power conversion and isolation 130); or DC energy storage device 136 (via DC-DC power conversion and isolation 134). In one or some embodiments, the common DC bus 122 may be a nominally fixed-voltage DC bus architecture (+/−50Vdc) leveraging peak power rating of PCS with increased system stability and shared infrastructure for reduced cost. In practice, the common DC bus 122 may drift slightly from its rated fixed voltage based on amount of power provided to and/or drawn therefrom (e.g., based on load connections to the common DC bus 122), as discussed in more detail below.

In this regard, the grid-connected electric vehicle charging station system be connected to a standard meter, which may operate at no more than 600 V AC, at no more than 500 V AC, at no more than 240 V AC, at no more than 208 V AC, at no more than 120 V AC, etc. On the DC side, the grid-connected electric vehicle charging station system may operate at no greater than 1,500 V DC, at no greater than 1,000 V DC, etc. Thus, the grid-connected electric vehicle charging station system may be installed in a variety of locations (e.g., any metered location in a utility grid, such as an urban environment or a rural environment) for a variety of purposes (e.g., fleet depot; bus depot; distribution center; public charging station; etc.).

In addition, FIG. 1A illustrates various types of power conversion. One type of power conversion may convert alternating current (AC) into direct current (DC) and vice versa. See AC-DC power conversion and isolation 120. In particular, an AC-DC converter (interchangeably termed AC-DC converter electronics) may comprise a device that converts an AC voltage to DC voltage. By way of example and not limitation, electricity supplied by the grid may be in 100V AC or 200V AC. The common DC bus 122 (interchangeably termed a common DC power bus) may operate at a DC voltage, such as at 950 Vdc. The AC-DC converter may be configured to convert from alternating current to direct current and to the desired constant voltage (e.g., 950 Vdc). In one implementation, the AC-DC converter may include a transformer with 2 magnetically coupled windings, with one winding (called the primary) that is driven by the AC supply and another winding (called the secondary) that serves as the power input to the AC-DC converter. The secondary winding may be connected to a full wave bridge rectifier, a smoothing capacitor, and a voltage regulator (e.g., to control the output of the AC-DC converter to the desired output DC voltage). Thus, any of the following may be perform the AC-DC conversion: rectifier; mains power supply unit (PSU); motor-generator; rotary converter; or switched-mode power supply.

Thus, AC-DC power conversion and isolation 120 may be electrically connected to meter 110. In one or some embodiments, AC-DC power conversion and isolation 120 may be indirectly electrically connected to meter 110 (e.g., via one or more intermediate devices, such as intermediate device(s) 112, which may comprise a load panel). Alternatively, AC-DC power conversion and isolation 120 may be directly electrically connected to meter 110.

Another type of power conversion may convert DC into another DC. In particular a DC-to-DC converter may comprise an electronic circuit or electromechanical device that converts a source of direct current (DC) from one voltage level to another. Thus, any of the following may be perform the DC-DC conversion: linear regulator; voltage regulator; motor-generator; rotary converter; or switched-mode power supply. For example, galvanically isolated DC-DC converters may be used, which may enable safe operations using ground fault detection and isolation. In this way, the DC-DC converters may provide the necessary isolation and may prevent ground fault detection issues so that the charging stations may charge a respective electric vehicle with a predetermined voltage throughout the charging process using the same DC bus (e.g., the common bus).

In practice, the various electronic devices, such as the DC power generation 132 or the DC energy storage device 136, may change its output DC voltage. As one example, the output of the DC power generation 132 (e.g., the PVs) may change based on solar radiance changes. As another example, the output battery voltage may change with the state of charge, temperature, etc. Thus, in one or some embodiments, the electronics 131, 135 (which may include droop curve control) may ensure that the voltage supplied to the common DC bus 122 may be stable and predetermined, as discussed further below. In particular, controller, which may be distributed in the DC architecture, may be embodied in electronics 131, 135 and configured to control the flow of power to and/or from any one, any combination, or all of: power from DC power generation 132; power to and/or from DC energy storage device 136; or power from AC utility grid 102.

More specifically, in one or some embodiments, control in the architecture (such as the DC architecture) may be distributed amongst various devices. This is illustrated in electronic 131, 135, which reside in DC-DC power conversion and isolation 130, 134, respectively associated with DC power generation 132 and DC energy storage device 136, respectively. In particular, electronics 131 may be configured to execute rules, algorithms, or the like (such as embodied in droop curves) in order to stabilize the common DC bus 122. In this regard, electronics 131 may include the following functionality: (i) ability to sense at least one aspect of the common DC bus 122 (e.g., using sensor 129 to sense voltage, current, power, etc.); (ii) intelligence to determine whether the sensed at least one aspect indicates bus instability (e.g., voltage deviation from the rated voltage greater than a predetermined amount); and (iii) intelligence (based on the rules, algorithms, or the like) to modify flow of power, voltage, current, etc. to or from the common DC bus 122 in order to more stabilize the common DC bus 122.

Though electronics 131 is depicted as being within DC-DC power conversion and isolation 130, electronics, including the rules, algorithms or the like, may be separate from (but associated with) DC-DC power conversion and isolation 130 so that the rules, algorithms, or the like may work in combination with DC-DC power conversion and isolation 130 for control of the section of the DC architecture. In particular, electronics 131 may be configured to control the power, voltage, current, or the like to common DC bus 122 (as provided by DC power generation 132) in order to stabilize the common DC bus 122.

Likewise, though electronics 135 is depicted as being within DC-DC power conversion and isolation 134, electronics, including the rules, algorithms or the like, may be separate from (but associated with) DC-DC power conversion and isolation 134 so that the rules, algorithms, or the like may work in combination with DC-DC power conversion and isolation 135 for control of the section of the DC architecture. In particular, electronics 135 may be configured to control the power, voltage, current, or the like to and/or from common DC bus 122 (as sourced by or as received by DC energy storage device 136) in order to stabilize the common DC bus 122.

As discussed in more detail below, in one or some embodiments, near-term or real-time control for the stability of the common DC bus 122 may be performed by electronics 131, 135 independent of operation of other electronics and without communication from other electronics. For example, as depicted in FIG. 1A, electronics 131 may be configured to, in real-time, modify power sent from DC power generation 132 to common DC bus 122 without any communication input from any other electronic devices (such as electronics 135). Rather, droop curves resident within electronics 131 may be used to determine how to modify the power sent from DC power generation 132 to common DC bus 122. Likewise, electronics 135 may be configured to, in real-time, modify power sent to or sourced from common DC bus 122 without any communication input from any other electronic devices (such as electronics 131). Rather, droop curves resident within electronics 135 may be used to determine how to modify the power sent to or received from DC energy storage device 136 with regard to common DC bus 122. The distributed nature of the control, such as embodied in electronics 131, 135, may allow for real-time control (e.g., no more than 5 microseconds; no more than 10 microseconds; no more than 15 microseconds; no more than 20 microseconds; no more than 5 milliseconds; no more than 10 milliseconds; no more than 15 milliseconds; no more than 20 milliseconds; etc.).

In addition, FIG. 1A illustrates sensors 129, 133 configured to sense one or more aspects of common DC bus 122, such as any one, any combination, or all of power, voltage or current. FIG. 1A further illustrates electronics 114, resident within or associated with meter 110. Likewise, FIG. 1A illustrates electronics 121, resident within or associated with AD-DC power conversion and isolation 120. In one or some embodiments, one or both of electronics 114, 121 may be configured to modify power sent to or sourced from common DC bus 122.

Thus, in one or some embodiments, control electronics, which may be embodied in electronics 114, 121, 131, 135, may operate in real-time (or near real-time or short term) independently of one another and without being dependent on any real-time communication from each other. Alternatively, or in addition, control, such as longer-term control (e.g., other than real-time control), may operate dependent on one another, such as dependent on communications between electronics 114, 121, 131, 135. For example, in one or some embodiments, one of electronics 114, 121, 131, 135 may embody a central controller configured to control any one, any combination, or all of: DC power generation 132; DC energy storage device 136; or power from AC utility grid 102. Such a central controller may thus be configured to perform centralized control of the architecture depicted in FIG. 1A.

Various types of centralized control are contemplated. As one example, control of DC power generation 132 may be responsive to receiving one or more commands for control from the central controller. For example, in one embodiment, DC power generation 132 is configured route power it generates to the common DC bus 122 unless receiving a command not to rout the power. Responsive to receiving the command, DC power generation 132 routes the power generated by DC power generation 132 to ground. Alternatively, DC power generation 132 routes power it generates to the common DC bus 122 responsive to receiving a command to rout the power.

As another example, control of DC energy storage device 136 may be responsive to receiving one or more commands to store DC power and/or to route DC power to common DC bus 122. As yet another example, power from AC utility grid 102 may be controlled via a command to AC-DC power conversion and isolation 120.

Figure 1B:
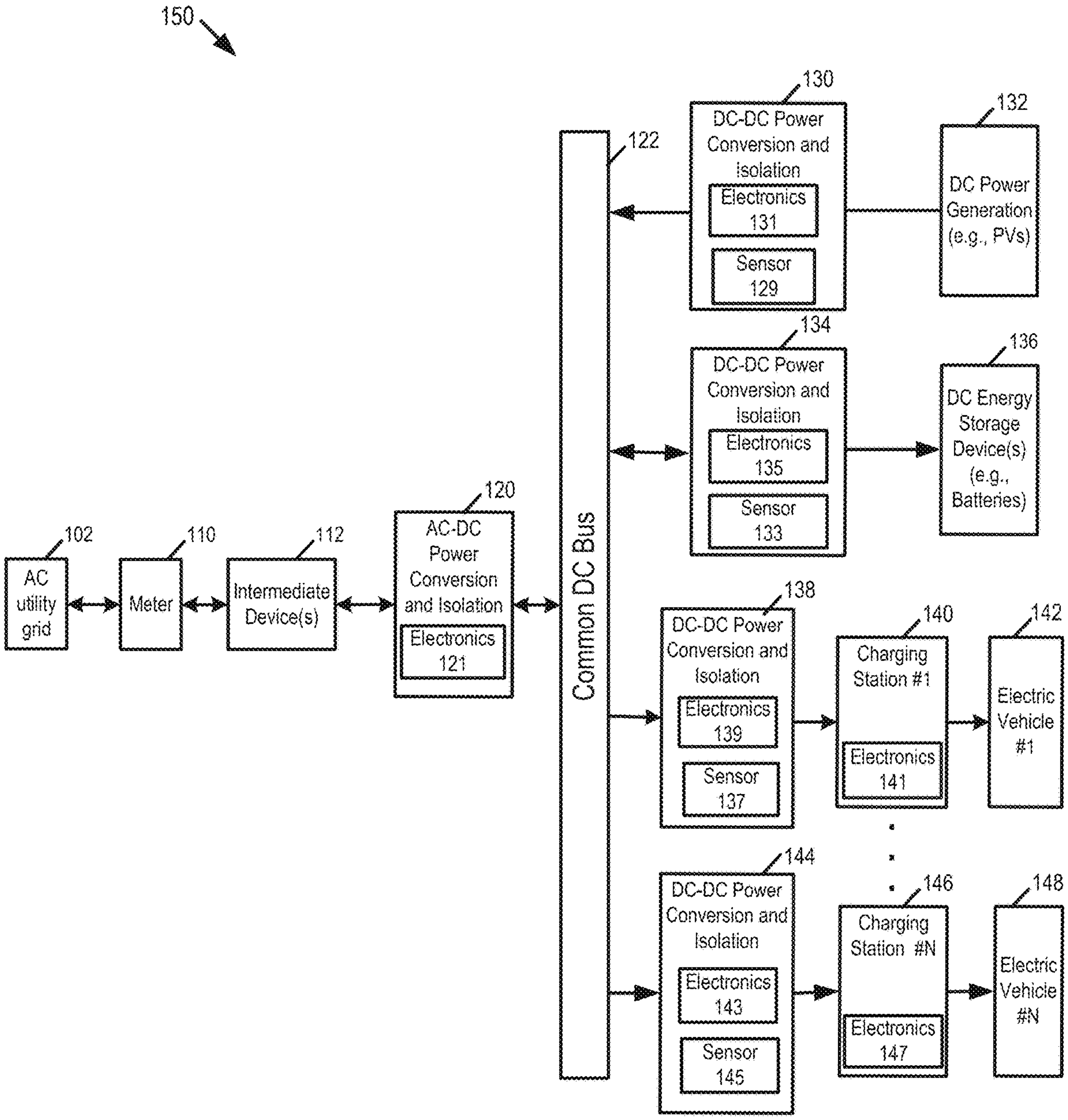
FIG. 1B is a block diagram illustrating a grid-connected DC architecture using a common DC bus, DC power generation, DC energy storage device(s), and a plurality of electric machines for charging.

FIG. 1B is a block diagram 150 illustrating a grid-connected electric vehicle charging station system using a common DC bus 122, DC power generation 132 (e.g., a plurality of solar panels, such as photovoltaics (PVs)), DC energy storage device 136 (e.g., one or more batteries), a plurality of charging stations 140, 146, and a plurality of electric vehicles 142, 148 for charging. Various electric vehicles are contemplated, including electric automobiles, electric trucks, etc. Further, in one or some embodiments, other electric devices, separate from vehicles, may be charged at the plurality of charging stations 140, 146.

In one or some embodiments, the charging stations 140, 146 may be one or both of: (1) DC charging stations; and (2) isolated from one, some, or all of the other charging stations at the site. As discussed herein, various parts of the system may operate in the DC realm, such as DC power generation 132 and DC energy storage device 136. As such, the charging stations 140, 146 may also operate in the DC realm, thereby reducing loss in conversion to AC. Further, the charging stations 140, 146 may include a charging head (e.g., an electricity dispenser) through which the loads (e.g., the vehicles) may connect and be charged.

As shown in FIG. 1B, common DC bus 122, separate from the connections illustrated in FIG. 1A, may further be connected to the plurality of charging stations (e.g., charging station #1 (140) to charging station #N (146) via, respectively, a plurality of DC-DC power conversion 138, 144).

As shown in FIG. 1B, electronics 139, 141 are associated with DC-DC power conversion 138, and charging station #1 (140), respectively. In practice, one or both of electronics 139, 141 may be configured to perform: (1) charging functionality to charge electric vehicle #1 (142); and (2) DC bus stability functionality configured to stabilize common DC bus 122 (e.g., utilizing droop curves). In one or some embodiments, the functionality may be divided amongst the electronics, with (1) being performed by electronics 141 and (2) being performed by electronics 139. Alternatively, only one electronics may perform both functions, such as either electronics 139 or electronics 141.

Similarly, electronics 143, 147 are associated with DC-DC power conversion 144, and charging station #N (146), respectively. In practice, one or both of electronics 143, 147 may be configured to perform: (1) charging functionality to charge electric vehicle #N (146); and (2) DC bus stability functionality configured to stabilize common DC bus 122 (e.g., utilizing droop curves). In one or some embodiments, the functionality may be divided amongst the electronics, with (1) being performed by electronics 147 and (2) being performed by electronics 143. Alternatively, only one electronics may perform both functions, such as either electronics 143 or electronics 147. FIG. 1B further includes sensors 137, 145 configured to sense one or more aspects of common DC bus 122 including any one, any combination, or all of power, voltage or current. The sensor data generated by sensors 137, 145 may be used to determine whether the common DC bus 122 is stable or unstable.

For example, determination as to power to route a respective charging station, such as to charging station #1 (140) or charging station #N (146), may be triggered by connection of electric vehicle to the charging station via the charging head. In one or some embodiments, the respective charging station itself includes the intelligence (whether resident in electronics 139 or 141, or in electronics 143 or 147) to determine how much power is drawn from the common DC bus 122. Alternatively, or in addition, a central controller may be configured to determine the amount of power for the respective charging station to draw from the common DC bus 122 and to instruct the respective charging station accordingly.

Figure 2A:
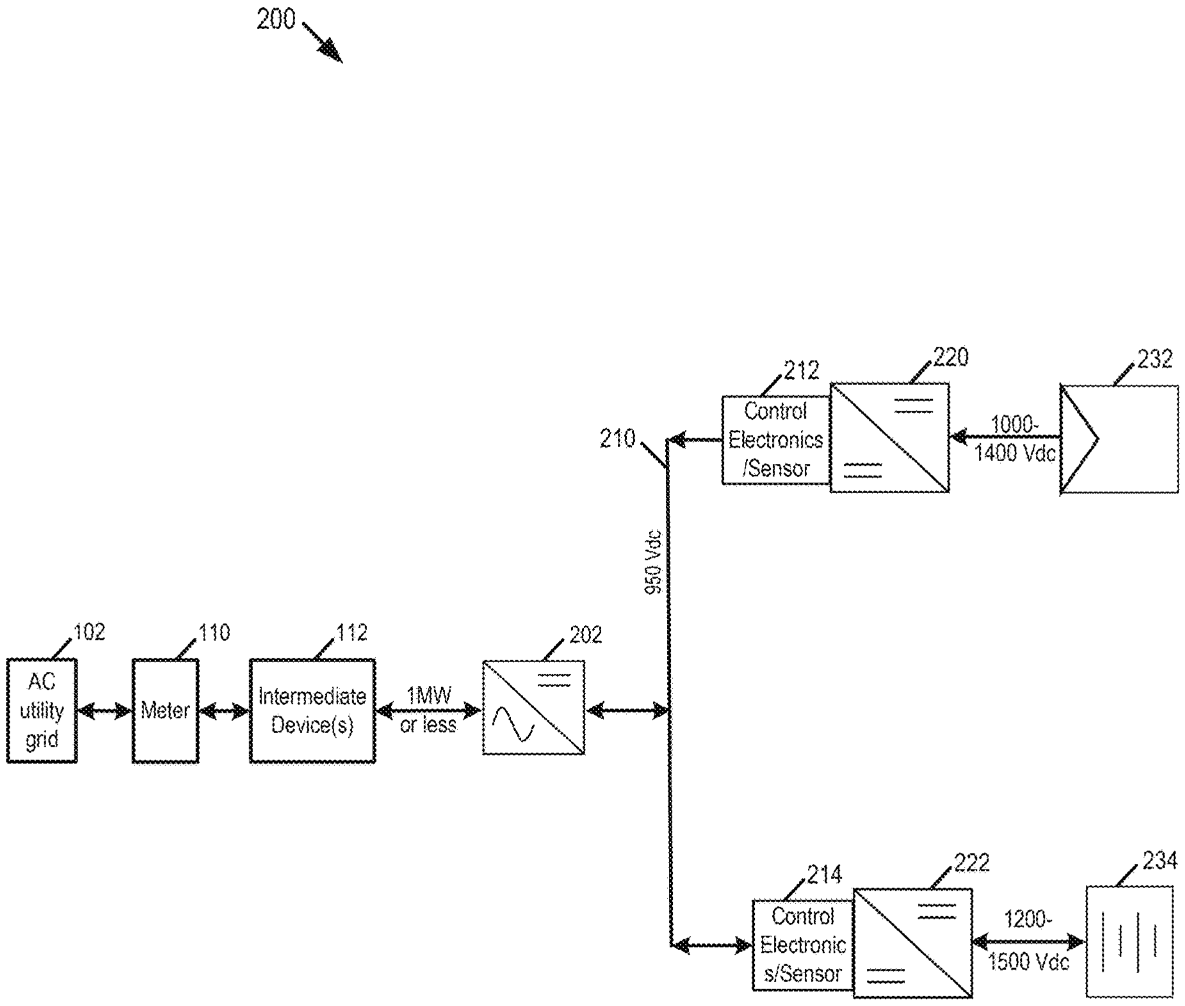
FIG. 2A is a first block diagram illustrating grid-connected DC architecture using a DC bus, PVs, and batteries, with DC-DC converters (with associated control electronics) electrically connecting the PVs and batteries to the DC bus.

FIG. 2A is a first block diagram 200 illustrating grid-connected DC architecture using a DC bus 210, PVs 232, and batteries 234, with DC-DC converters 220, 222 (with associated control electronics/sensors 212, 214) electrically connecting the PVs 232 and batteries 234 to the DC bus 210.

As discussed above, power conversion may be used to modify the AC output of the AC devices (e.g., meter 110, which may route at most 1 MW). See AC-DC power converter 202. Alternatively, or in addition, power conversion may be used to modify the DC output of the DC devices. For example, the output generated by PVs 232 may be 1,000-1,400 Vdc may be converted to 950 Vdc to match the voltage on DC bus 210 using DC-DC converter 220. Still alternatively, or in addition, the output generated by batteries 234 may be 1,200-1,400 Vdc may be converted to 950 Vdc to match the voltage on DC bus 210 using DC-DC converter 222. In this regard, the DC-DC converters for the PVs 232 and the batteries 234 may be different from one another.

Figure 2B:
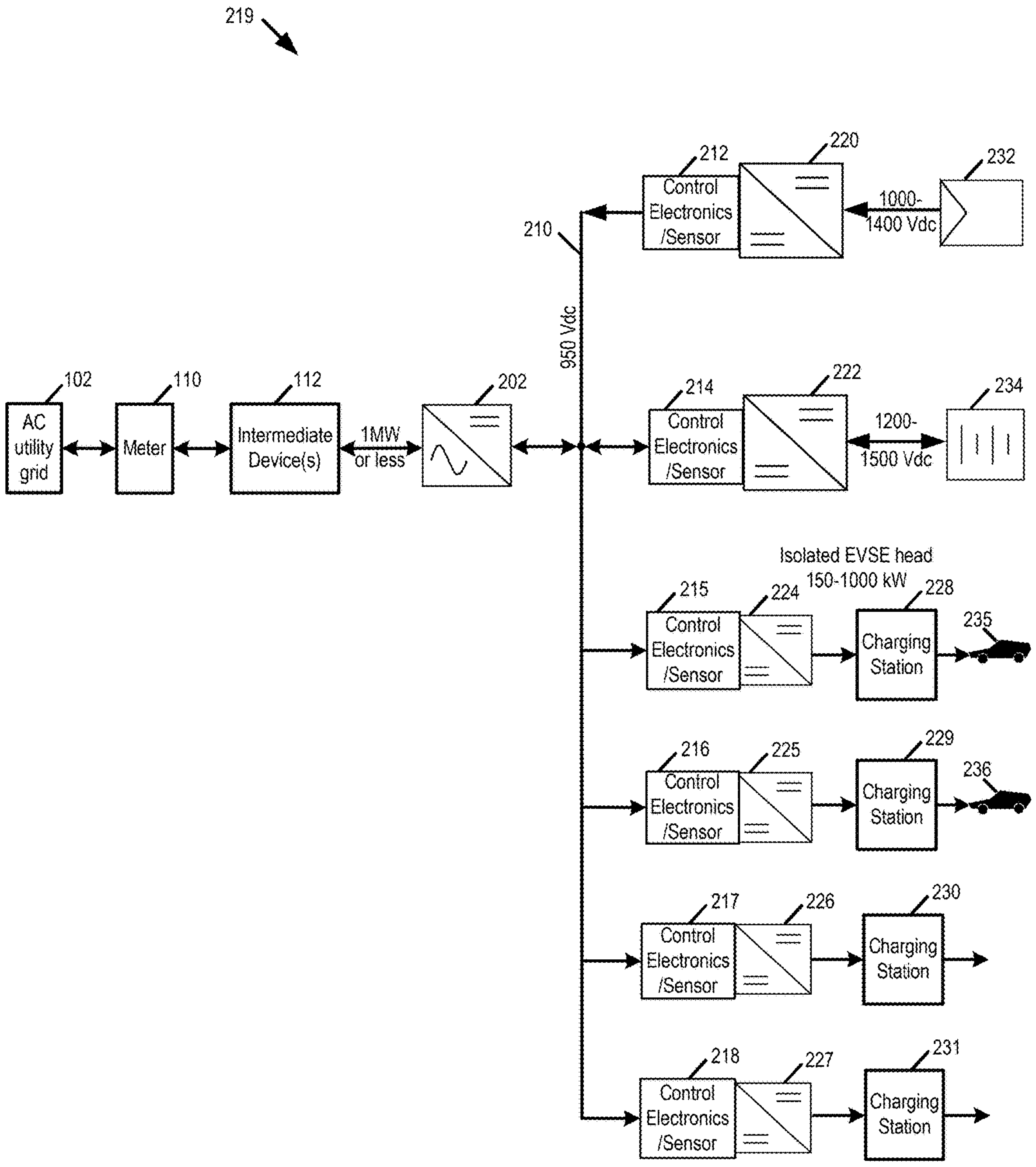
FIG. 2B is a second block diagram illustrating a grid-connected electric vehicle charging station system using a DC bus, PVs, batteries, and a plurality of charging stations, with DC-DC converters (with associated control electronics) electrically connecting the PVs, batteries, and the plurality of charging stations to the DC bus.

FIG. 2B is a second block diagram 219 illustrating a grid-connected electric vehicle charging station system using a DC bus 210, PVs 232, batteries 234, and a plurality of charging stations 228, 229, 230, 231, with DC-DC converters 220, 222, 224, 225, 226 (with associated control electronics/sensors 212, 214, 215, 216, 217) electrically connecting the PVs 232, batteries 234, and the plurality of charging stations 228, 229, 230, 231 (with electric vehicles 235, 236 being charged at charging stations 228, 229, respectively) to the DC bus 210.

Likewise, power conversion may be used to electrically connect the plurality of charging stations 228, 229, 230, 231 to DC bus 210 (e.g., DC-DC converters 224, 225, 226, 227 for charging stations 228, 229, 230, 231) so that electric vehicle supply equipment (EVSE), such as the charging stations, deliver to the isolated EVSE head 150-1000 kW.

Figure 2C:
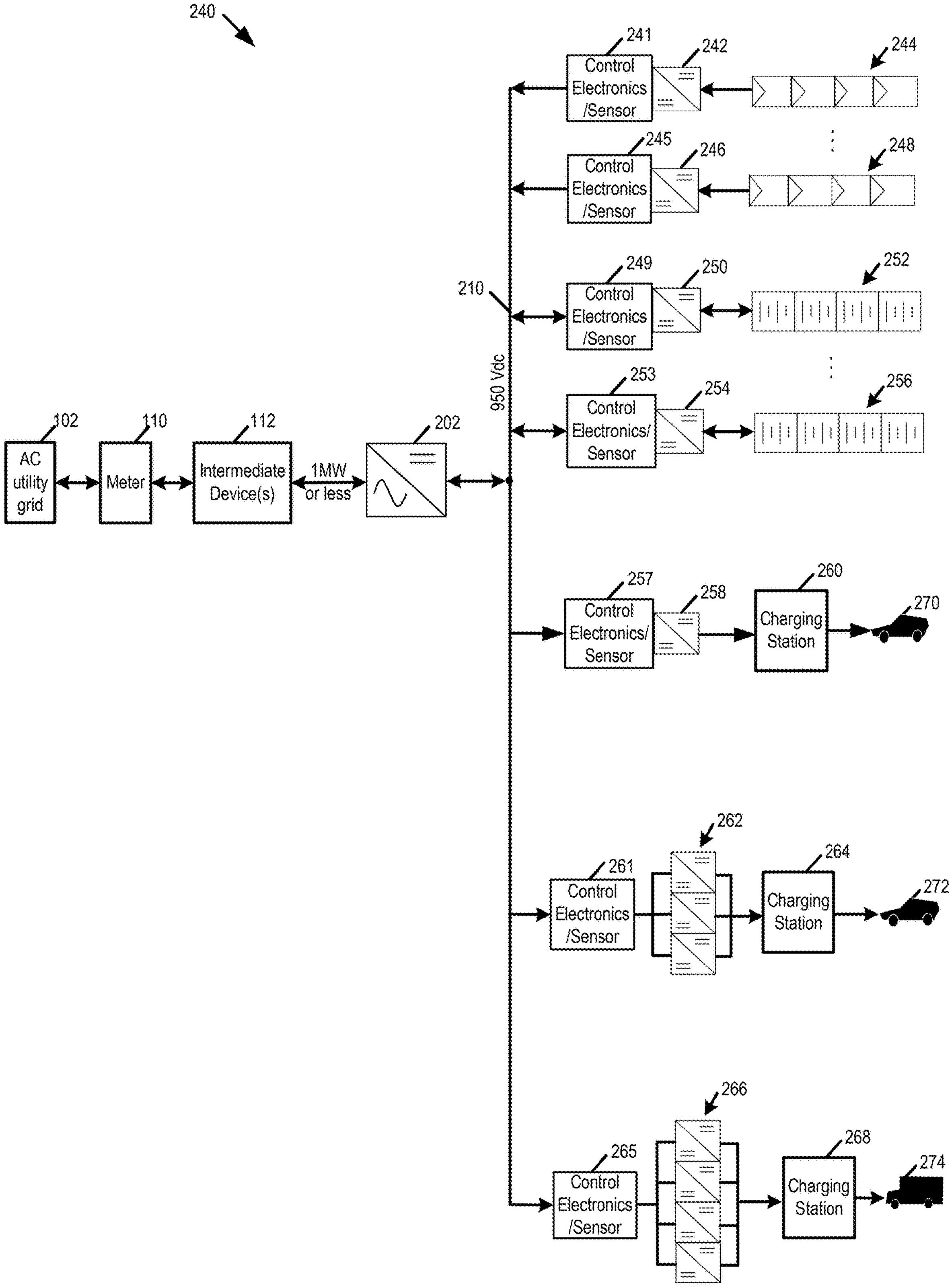
FIG. 2C is a third block diagram illustrating a grid-connected electric vehicle charging station system using a DC bus, PVs, batteries, and a plurality of charging stations, with modular DC-DC converters (with associated control electronics) electrically connecting the PVs, batteries, and the plurality of charging stations to the DC bus.

FIG. 2C is a third block diagram 240 illustrating a grid-connected electric vehicle charging station system using a DC bus 210, PVs 244, 248, batteries 252, 256, and a plurality of charging stations 260, 264, 268, with modular DC-DC converters 242, 246 (with associated control electronics/sensors 241, 245) electrically connecting the PVs 244, 248, modular DC-DC converters 250, 254 (with associated control electronics/sensors 249, 253) electrically connecting batteries 252, 256, and modular DC-DC converters 258, 262, 266 (with associated control electronics/sensors 257, 261, 265) for the plurality of charging stations 260, 264, 268 (with electric vehicles 270, 272, 274 being charged by charging stations 260, 264, 268, respectively) to the DC bus 210.

In particular, each grouping of PVs may have a respective DC-DC converter (see first grouping of PVs 244 having respective DC-DC converter 242 (with associated control electronics/sensors 241) and second grouping of PVs 244 having respective DC-DC converter 246 (with associated control electronics/sensors 245)). Similarly, each grouping of batteries may have a respective DC-DC converter (see first grouping of batteries 252 having respective DC-DC converter 250 (with associated control electronics/sensors 249) and second grouping of batteries 256 having respective DC-DC converter 254 (with associated control electronics/sensors 253)). Likewise, different charging stations may be rated with different capacities for charging based on the modular nature of the architecture. For example, DC-DC converter 258 (with associated control electronics/sensors 257) includes a single DC-DC converter unit, whereas DC-DC converter 262 (with associated control electronics/sensors 261) includes three DC-DC converter units and DC-DC converter 266 (with associated control electronics/sensors 265) includes four DC-DC converter units. In one or some embodiments, each DC-DC converter unit includes the same capacity, so that charging station 264 may provide charging capability to electric vehicle 272 three times the charging capacity of charging station 260 to electric vehicle 270 and charging station 268 may provide charging capability to electric vehicle 274 four times the charging capacity of charging station 260 to electric vehicle 270. Thus, the DC bus 210 may act as the generic backbone to the system, with the modular DC-DC converters stacked together enabling flexible configuration tailored to the end needs of a respective charging station. This modular layout may be used to tailor the system for a one-system-configuration-fits-all strategy for any one, any combination, or all of: PV layouts; battery layouts; charging station layouts; or electric vehicle requirements.

For example, a common DC/DC converter architecture (with associated control electronics) may be used to ensure interconnection of PVs 244, 248, batteries 252, 256, and the plurality of charging stations 260, 264, 268 (e.g., electric vehicle supply equipment (EVSE)) on a shared common DC bus 210. Such a design may be parallelable and/or scalable to serve various vehicles from small personal vehicles (at 50 kW levels, such as no more than 50 kW, no more than 60 kW, no more than 70 kW, no more than 80 kW, no more than 90 kW, no more than 100 KW, etc.), up to large long-distance vehicles (at least 2 MW). This is illustrated in FIG. 2C in which different types of vehicles may be charged. This may enable the same charging station configuration to serve both quick "refueling" of large numbers of daytime commuters as well as fewer faster charging medium or heavy duty vehicles overnight without unique infrastructure or the constant need to re-position vehicles in front of power limited fixed infrastructure. In this regard, the charging stations may be modularly configurable based on desired capacity for charging a respective electric vehicle.

Further, because control electronics is associated with the different DC-DC converters, independent control at the DC-DC converter level may be implemented. In particular, FIG. 2C illustrates that the PVs may be subdivided into 244 and 248 and/or the batteries may be subdivided into 252 and 256, these branches, which separately connect to the common DC bus 210, may likewise be separately controlled by control electronics/sensors 241, 245 and control electronics/ sensors 249, 253 (e.g., employing droop curve control), providing more granular control in stabilizing the common DC bus 210.

Thus, FIG. 2C includes DC-DC converters 242, 246, 250, 254, 258, 262, 266, which in one embodiment, may be identical in capacity (e.g., providing the same change in voltage). Alternatively, DC-DC converters 242, 246, 250, 254, 258, 262, 266 may have different capacities.

Further, FIG. 2C illustrates an integration of advanced power electronics controls with modular (e.g., right-sized) power converters to enable a highly configurable system charging infrastructure design with minimal (or even zero) utility service upgrade requirements to serve a variety of electric vehicle charging profiles.

Figure 2D:
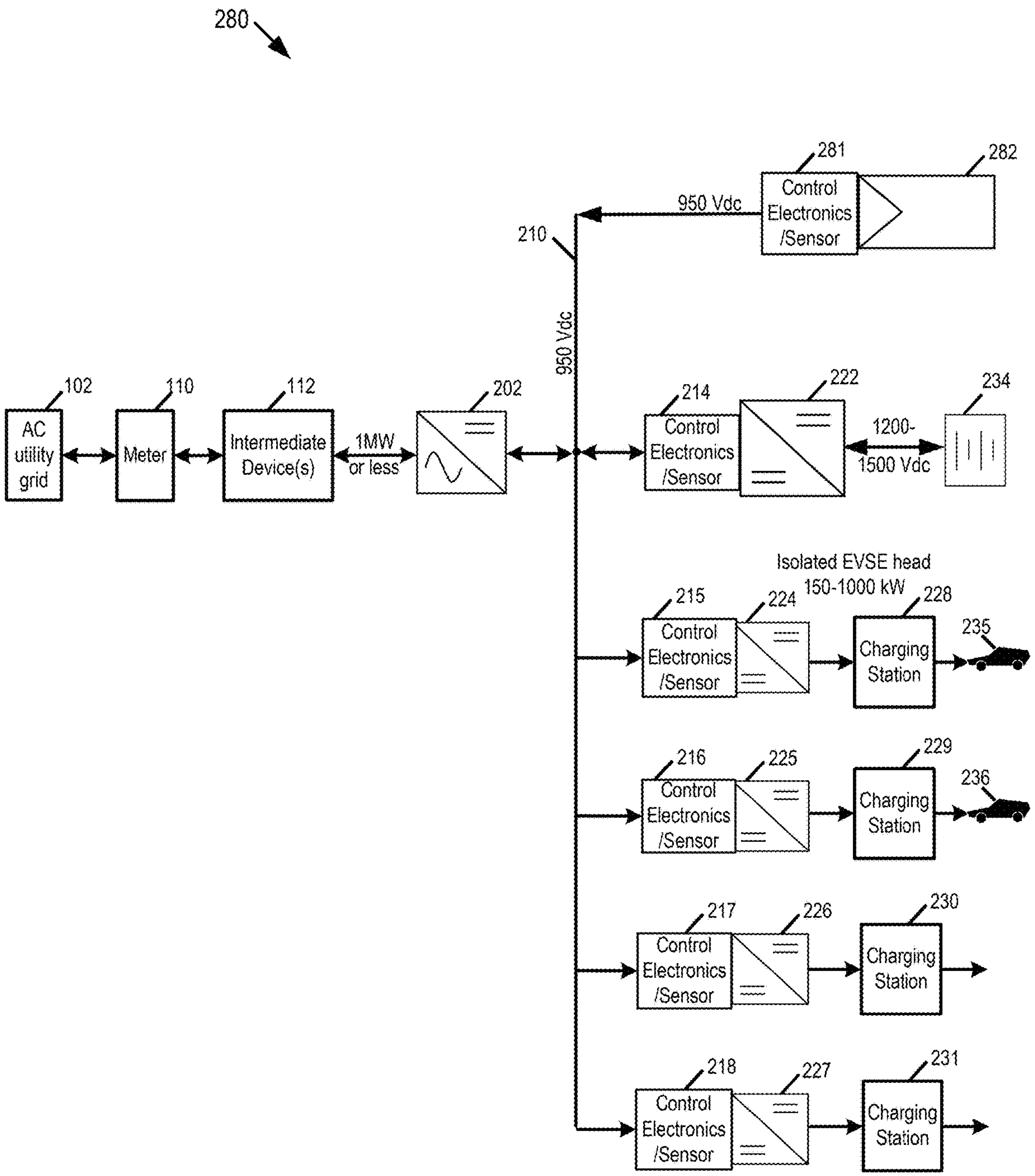
FIG. 2D is a fourth block diagram illustrating a grid-connected electric vehicle charging station system using a DC bus, PVs, batteries, and a plurality of charging stations, with DC-DC converters (with associated control electronics) electrically connecting the batteries and the plurality of charging stations to the DC bus.

FIG. 2D is a fourth block diagram 280 illustrating a grid-connected electric vehicle charging station system using a DC bus 210, PVs 282, batteries 234, and a plurality of charging stations 228, 229, 230, 231 with DC-DC converters 224, 225, 226, 227 (with associated control electronics/sensors 215, 216, 217, 218) electrically connecting the batteries 234 and the plurality of charging stations 228, 229, 230, 231 to the DC bus 210. As shown in FIG. 2C, PVs 282 generate 950 Vdc. As such, connection to DC bus 210 (which operates at 950 Vdc) does not require a DC-DC converter. Nevertheless, control electronics/sensors 281 (which may include droop curve control) may be associated with PVs 282 in order to include droop curve control.

Figure 2E:
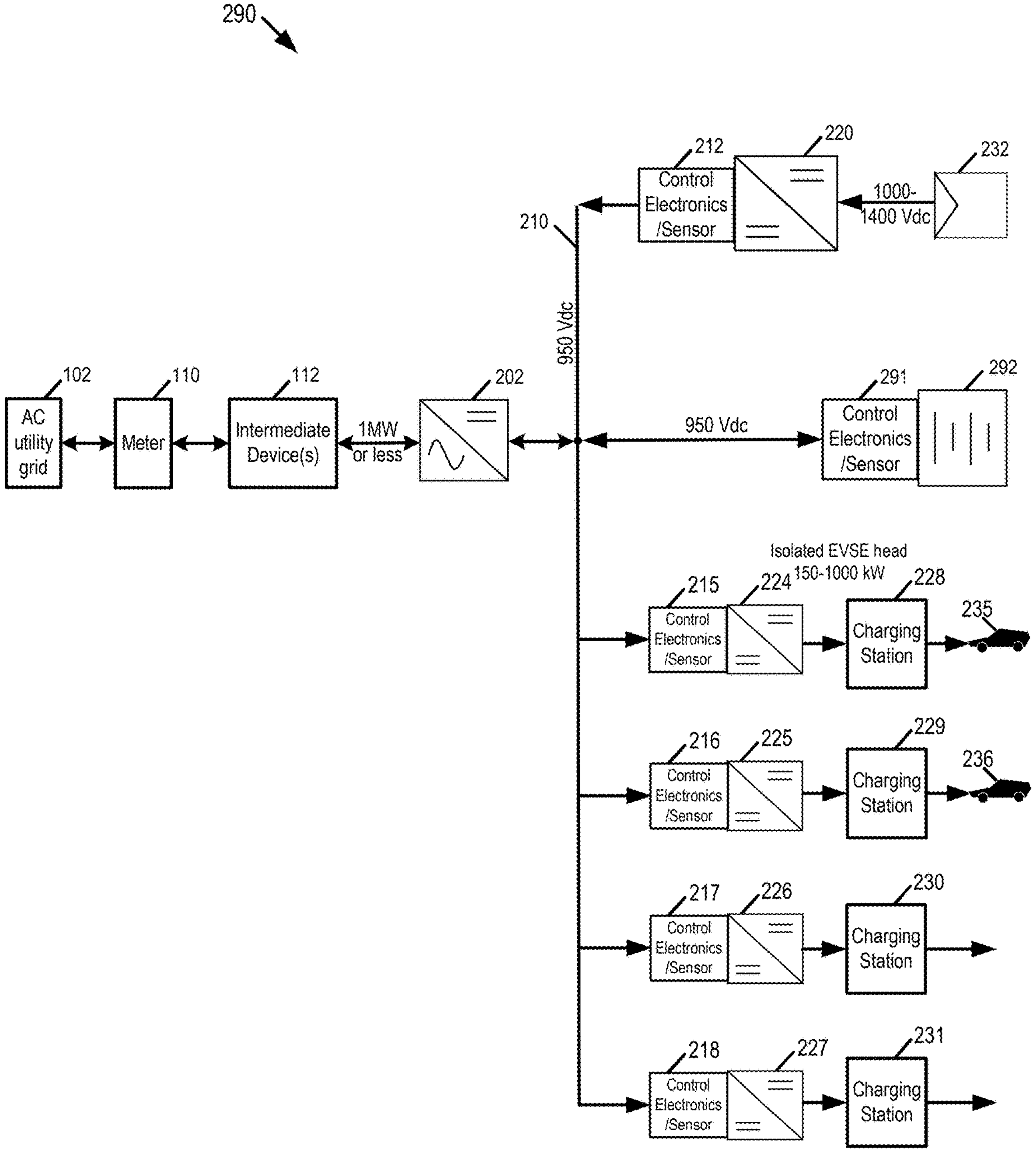
FIG. 2E is a fifth block diagram illustrating a grid-connected electric vehicle charging station system using a DC bus, PVs, batteries, and a plurality of charging stations, with DC-DC converters (with associated control electronics) electrically connecting the PVs and the plurality of charging stations to the DC bus.

FIG. 2E is a fifth block diagram 290 illustrating a grid-connected electric vehicle charging station system using a DC bus 210, PVs 232, batteries 292, and a plurality of charging stations 228, 229, 230, 231 with DC-DC converters 224, 225, 226, 227 (with associated control electronics/sensors 215, 216, 217, 218) electrically connecting the PVs 232 and the plurality of charging stations 228, 229, 230, 231 to the DC bus 210. As shown in FIG. 2E, batteries 292 operate at 950 Vdc. As such, connection to DC bus 210 (which operates at 950 Vdc) does not require a DC-DC converter. Nevertheless, control electronics/sensors 291 may be associated with batteries 292 in order to include droop curve control. Still alternatively, neither PVs nor batteries need to electrically connect to DC bus 210 if both PVs and batteries operate at 950 Vdc. Nevertheless, control electronics, including droop curve control, may be associated with each of PVs and batteries. Thus, as shown in FIGS. 2B-E, DC-DC converters may isolate the charging stations from the DC bus 210.

Figure 3A:
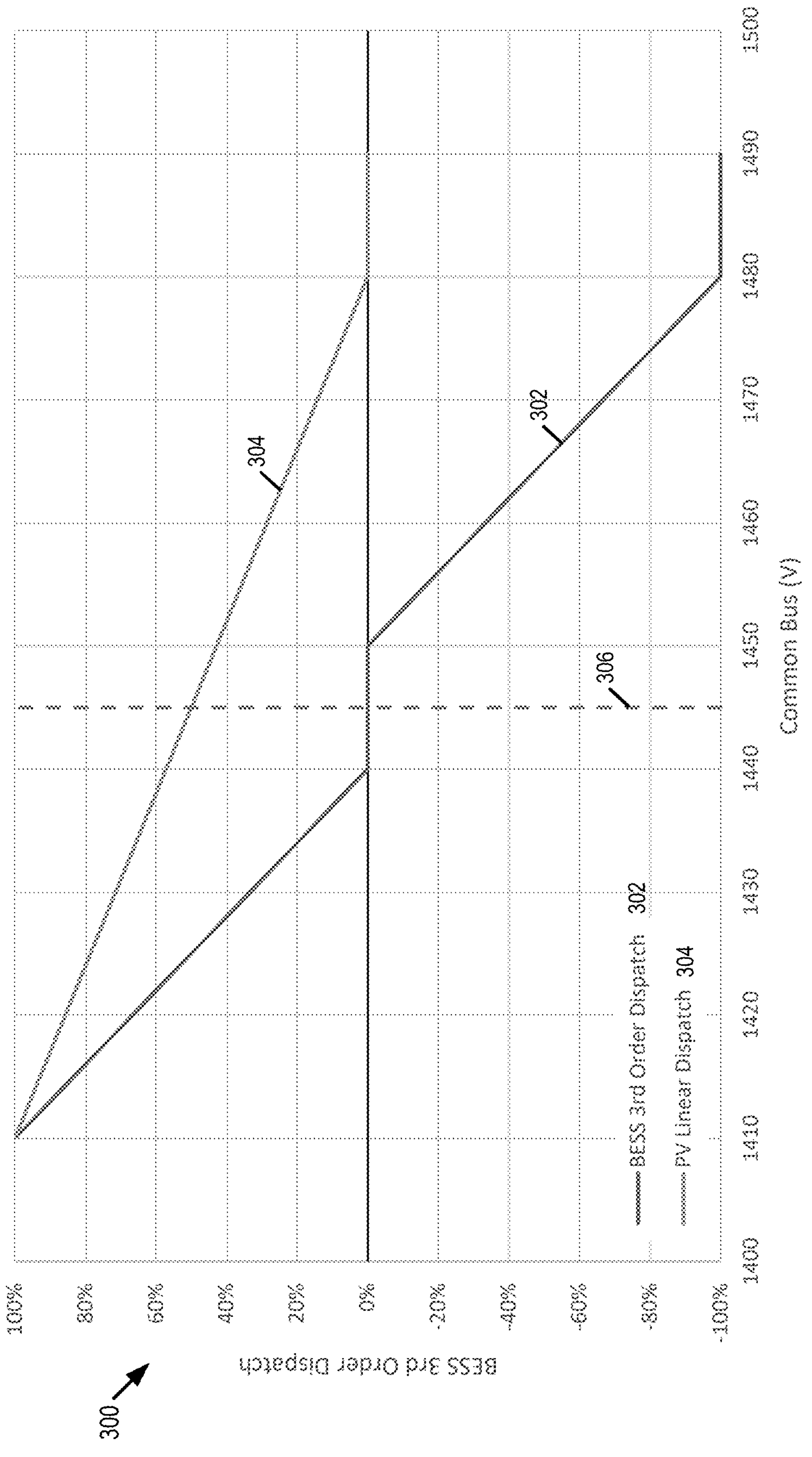
FIG. 3A is a graph of an example droop curve.

FIG. 3A is a graph 300 of an example droop curve. FIGS. 3B-E are various tables 310, 320, 330, 340 associated with parameters for the droop curve illustrated in FIG. 3A. In one or some embodiments, a droop curve may comprise a first order function, and be defined by a slope and an intercept. Alternatively, the droop curve may comprise a higher-order function, such as a $2^{nd}$ order function or a 3rd order function, and/or may be defined by a discontinuity. Regardless, the droop curve may be defined by one or more aspects.

In particular, graph 300 includes two curves, including BESS 3rd order dispatch 202 and PV linear dispatch 304. Further, line 306 indicates the voltage (1450 V), alternatively termed the reference voltage, at which the common bus is to be set. In this regard, the resulting control may seek to maintain the common bus at the designated reference voltage, such as through one or both of the amount of power the battery outputs and/or the amount of power the PVs output (e.g., the reference voltage may define, based on the currently sensed voltage on the DC bus, whether to inject or absorb power from the DC bus to re-normalize the voltage on the bus to the reference voltage). As discussed in more detail herein, central controller(s) may dynamically update or reinterpret the one or both of the first droop curve or the second droop curve by dynamically updating the designated reference voltage. Thus, in one or some embodiments, the control of the system may be dependent on the value assigned to the reference voltage (e.g., changing the reference voltage from 1450 V to 1440 V). For example, adjusting of the reference voltage control of any one, any combination, or all of: the amount of power supplied by the batteries; the amount of power supplied by the PVs; the amount of power drawn from the AC grid; or the amount of power supplied to the AC grid. Alternatively, or in addition, the control on the system may be dependent on the value assigned to the slopes of droop curve, with the change resulting in a change in control of the DC bus.

Various conditions may trigger a change in the one or more aspects of the droop curve, including any one, any combination, or all of the following: (i) changes in pricing (e.g. real-time pricing changes in the cost of electricity); (ii) changes in demand (e.g., a change in load may trigger a re-allocation of resources); (iii) changes in grid (e.g., a loss of power in a section of the grid or a change to a microgrid may result in an automatic trigger to change the droop curves); or (iv) a failure of hardware (e.g., string(s) of battery failures may result in a need to compensate therefore).

As shown, for curve 302, there is a deadband between 1440-1450 V in which the BESS 3rd order dispatch is unmodified. Outside which, in ranges 1410-1440 V and 1450-1480 V, lines with the same slope embody curve 302. Further, voltages greater than 1480 V results in BESS 3rd order dispatch being −100%. Curve 304 comprises a line from 1410-1480 V. Voltages 1480 and greater result in the PV linear dispatch of zero.

Figure 4A:
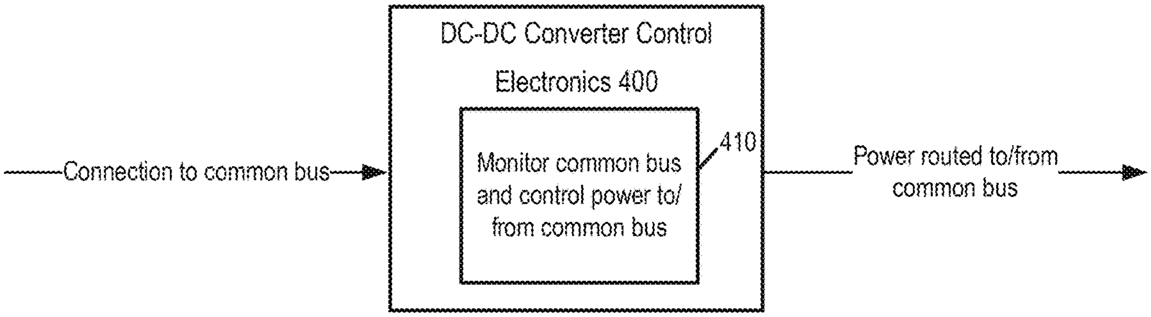
FIG. 4A is a block diagram of DC-DC converter control electronics.

In one or some embodiments, control may be decentralized, such as resident in one, some, or each of the converters in the architecture. As one example, the control may be resident in the DC-DC converter for any one, any combination, or all of the DC power generation, the DC energy storage, or the DC load (e.g., the charging station), such as illustrated in FIG. 4A, which is a block diagram of DC-DC converter control electronics 400. As shown, DC-DC converter control electronics 400, which may comprise a DC-DC converter and at least one controller, is configured to input the voltage from the common DC bus. In response to fluctuations in the voltage from the common DC bus, monitor common bus and control power 410 of DC-DC converter control electronics 400 is configured to modify the amount of power sent to the load. In particular, As discussed above, one or more parts of the system may implement control. In one or some embodiments, the system control is manifested in at least one central controller configured to manage high-level functions. For example, when a new electric vehicle plugs into a respective charging station, the central controller may be configured to acknowledge the new electric vehicle and make general decisions as to how much power is routed to charge the new electric vehicle (e.g., if there are already three other vehicles plugged in that are consuming the maximum amount of power available, and then the new electric vehicle is plugged in, the central controller is configured to decide how to divide the power amongst the four electric vehicles that are now charging). As such, the central controller may be configured to make longer-term decisions as to the apportionment of power. In one or some embodiments, shorter-term decisions, such as on a timescale of milliseconds or microseconds, may be made in a decentralized manner. For example, where loads change or where there is a fault (e.g., the electric vehicle is unplugged from the charging station prior to being fully charged), the system may be configured for a more intuitive distributed response. In particular, in one or some embodiments, one, some or all of the DC-DC converters may sense the voltage on the common bus, which may change instantaneously due to a fault, premature unplugging, etc. In response to sensing the change, the DC-DC converters may be configured to respond accordingly (e.g., lower their current). The DC-DC converters may generate an automated response, which may comprise a correlated response (e.g., linear or non-linear) based on droop curves in that the amount of voltage drop/increase correlates to of amount of power drop/increase (e.g., a reduction in the amount of current). As discussed above, the central controller or the decentralized controller(s) may be implemented in various parts of the system, such as in the PCS, in various DC-DC converters, or the like.

In this regard, in one or some embodiments, the central controller may perform one or both of the following: energy management; or power management. With regard to energy management, the central controller may determine the amount of power generation that is available and may balance the energy available (e.g., including forecasting solar power generation on a day-to-day basis; determining the amount of grid power available, such as 24 MW hours available for a 1 MW/h grid connection) so that the central controller may determine how to distribute the energy available (e.g., charge different vehicles at a different rates (e.g., charge electric vehicles at a different power levels). With regard to power management, the central controller may, at any given time, balance the load (e.g., whether charging the electric vehicles, charging batteries, etc.) with the power generation. Various power balancing may be performed on the millisecond/microsecond scale, as discussed above, in order to maintain a stable voltage on the common bus.

Thus, in one or some embodiments, a controller, such as a central control may determine any one, any combination, or all of: when a respective vehicle is charged (e.g., immediately or at a future predetermined time); how much the respective vehicle is charged (e.g., the amount of power provided for charging the vehicle); or the priority of the respective vehicle in charging. As discussed further below, in one or some embodiments, the determination may be based on input (such as previously provided input or real-time input). For example, a respective electric vehicle owner may be presented with an option for surge pricing so that the respective electric vehicle owner may pay for priority in charging. Alternatively, each of the respective electric vehicles presented for charging may pay the same amount regardless of input. Still alternatively, or in addition, the controller may determine the amount of power provided to a respective electric vehicle based on the needs of the electric vehicle itself (e.g., size of the battery (e.g., larger or smaller) and/or the current amount of charge of the battery (e.g., a battery with higher charge may be given higher priority in order to more quickly fully recharge the battery; or a battery with lower charge may be given higher priority in order to more quickly fully recharge the battery). In this way, the charging may comprise a DC charging as a Service that is configurable.

Thus, the controller may determine, such as dynamically determine, which from a plurality of charging modes, which mode under which to operate. As discussed above, the controller may operate in any one of the following modes: (i) first-come-first-serve (e.g., maximum charge to the vehicles in the order in which they connect to the respective charging station); (ii) complete fractional power (e.g., 1 MW total available for 4 currently charging vehicles, evenly split amongst the 4 charging vehicles; when a charging vehicle leaves, the 1 MW total is split between the remaining 3 charging vehicles); (iii) pay-to-play (e.g., a respective charging vehicle may pay in order to obtain a higher charging priority and/or more power to charge); or (4) division of power according to current state and/or current capacity of the respective vehicle (e.g., two 50 kW vehicles and two 100 kW vehicles are charging; the two 100 kV vehicles, with higher capacity, are supplied ⅔ of the power available while the two 50 kV vehicles, with lower capacity, are supplied ⅓ of the power available).

In one or some embodiments, the current mode under which the controller operates may be dynamically determined. The dynamic determination may be based on one or more factors, such as any one, any combination, or all of: current pricing; current demand (e.g., number of vehicles requesting charging; amount of power requested; current status, such as percentage charge, of one or more of the vehicles); current state of grid (e.g., current stability of the grid); etc. Thus, the dynamic determination may be based on any one, any combination, or all of grid operator input, input from a consumer of one of the plurality of charging stations, current status of electric vehicles currently charging at the plurality of charging stations, or current capacity of the electric vehicles currently charging at the plurality of charging stations. Merely by way of example, demand may determine under which mode the controller operations (e.g., during lower demand periods, such as below a predetermined threshold power, the controller may operate on a first-come-first-serve basis; during higher demand periods, such as above the predetermined threshold power, the controller may operate on a pay-to-play basis). Alternatively, or in addition, the controller may operate in a mode determined on the system end (e.g., by an operator, such as a grid operator, inputting the designated mode from the utility grid side) or determined on the consumer end (e.g., a consumer requesting charging at a respective charging station may select the mode).

Further, in one or some embodiments, the controller may be configured to determine whether and/or when to access AC power from the grid. The controller may estimate future need, future capacity (e.g., from PVs and batteries) and costs of accessing the grid (e.g., based on a rate schedule for accessing power from the grid) in order to determine whether and/or when to access the AC power from the grid.

Figure 4B:
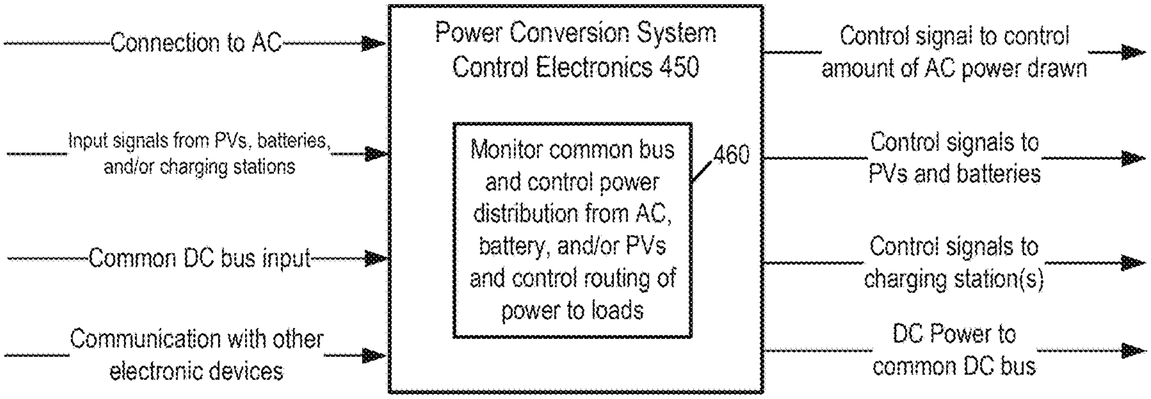
FIG. 4B is a block diagram of power conversion system control electronics.

Thus, in one or some embodiments, a central controller may be configured to control one or more electronic devices illustrated in FIG. 1A-B or 2A-E in the longer-term. FIG. 4B is a block diagram of power conversion system control electronics 450. As discussed above, AC utility grid 102 may be electrically connected to common DC bus 122 via meter 110 and AC-DC power conversion and isolation 120. In one or some embodiments, a power conversion system (PCS) (e.g., an inverter or a rectifier) may perform one or both of meter 110 and AC-DC power conversion and isolation 120. In particular, in one or some embodiments, power conversion system control electronics 450 may be configured as a PCS, which may comprise the intermediary between the AC utility grid 102 and the common DC bus 122, so that power input via the AC utility grid 102 (as illustrated as connection to AC) is converted into DC power to the common DC bus 122. Further, because the majority of the power is supplied by the PVs, requiring minimal grid energy so that the PCS may be reduced in size and in turn reduced in cost.

Alternatively, or in addition, power conversion system control electronics 450 may be configured as a controller, such as controlling any one, any combination, or all of the electronic elements illustrated in FIG. 1A-B or 2A-E. For example, power conversion system control electronics 450 may receive inputs from any one, any combination, or all of the electronic elements illustrated in FIG. 1A-B or 2A-E, such as inputs from any one, any combination or all of the PVs, batteries, charging station(s), or communications with other electronic devices. In response, power conversion system control electronics 450, using monitor common bus and control power distribution from AC, battery, and/or PVs, and control routing of power to loads 460, may generate one or more control signals, such as any one, any combination, or all of: control signal(s) to control how much AC power is drawn from AC utility grid 102; control signal(s) to PVs and/or batteries; or control signal(s) to charging station(s) to control amount to power to electric vehicle(s).

In this regard, the controller may be configured to receive one or more inputs and generate one or more outputs (such as illustrated in FIG. 4B). The one or more inputs may comprise one or more sensor inputs, one or more defined goals for control of the DC bus, and one or more sensed feedback (e.g., in monitoring performing of the goals). In this way, the controller may be configured to dynamically and in real-time to adjust to better meet the defined goals for control of the DC bus.

As one example, a defined goal may comprise matching the load(s) at the interconnection point in order to ensure that the amount of power meets but does not exceed the needs of the load(s). Further, the goals may change based on one or more events (e.g., a change, such as an increase in electricity rates, may curtail the amount of power distributed; the setpoint may be changed, such as raised, based on inputs, such as price of electricity or based on the Independent System Operator (ISO) or other regional transmission organization).

Thus, in one or some embodiments, the controller may manage the load by managing one or both of generation of power to the DC bus or load on the DC bus. The controller, as part of its inputs, may receive real-time information on generation, including one or both of real-time generation on the PVs (e.g., based on real-time production and/or real-time weather forecasts) or real-time supply from the batteries (e.g., based on sensors indicating an amount of power that may be supplied by the batteries). Alternatively, or in addition, the control may receive real-time information on the load(s), including one or more aspects of the electric vehicles (e.g., information regarding maximum charge capacity of the electric vehicle(s) and/or a current state of charge of the electric vehicle(s)).

Figure 5:
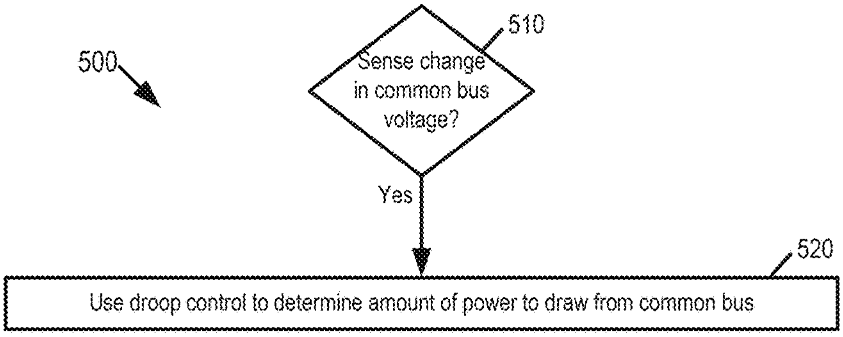
FIG. 5 is a flow diagram for a decentralized controller to determine an amount of power to draw from the common bus.

FIG. 5 is a flow diagram 500 for a decentralized controller to determine an amount of power to draw from the common bus. At 510, a device, such as the DC-DC controllers, may sense whether there a change in common bus voltage. If so, at 520, the device may use droop control to determine amount of power to draw from common bus. In this way, stable droop-based common DC bus control may be implemented with power-flow management site SCADA.

Thus, the various architectures disclosed may include a common bus, such as one or both of a common DC bus or a common AC bus, with branches on the common bus. In one or some embodiments, one, some or each branch from the common DC bus may include a DC-DC converter, which may: (i) stabilize the common DC bus; and (ii) provide reliable DC voltage behind the DC-DC converter (e.g., to the charging station for charging the electric vehicle). In one embodiment, the DC-DC converter topology may engender decentralized control. Alternatively, one of the DC-DC converters may comprise a master controller that is in charge. In either instance, balancing of power may occur (e.g., stronger DC-DC converters may provide more power and weaker DC-DC converters may provide less, with monitoring and feedback that may be provided for each individual DC-DC converter).

In one or some embodiments, certain functions (such as for planned events such as when charging of an electric vehicle is to begin or to end) may be controlled by a master controller. The master controller may be resident offsite (in the event that communications are sufficiently enough) or onsite (e.g., within or in communication with the PCS). Alternatively, or in addition, other functions (such as unplanned events) may be determined in a decentralized manner.

In all practical applications, the present technological advancement must be used in conjunction with a computer, programmed in accordance with the disclosures herein. Merely by way of example, various devices disclosed in the present application may comprise a computer or may work in combination with a computer (e.g., executed by a computer), such as, for example, in block diagrams in FIGS. 1A-4B or in flow diagram in FIG. 5. Merely by way of example, computing functionality may be manifested in the one or more electronic devices, such as in electronics 114, 121, 131, 135, 139, 141, 143, 147 (by way of example), or the like. As such, computing functionality may be resident within any of the electronic devices discussed herein.

Figure 6:
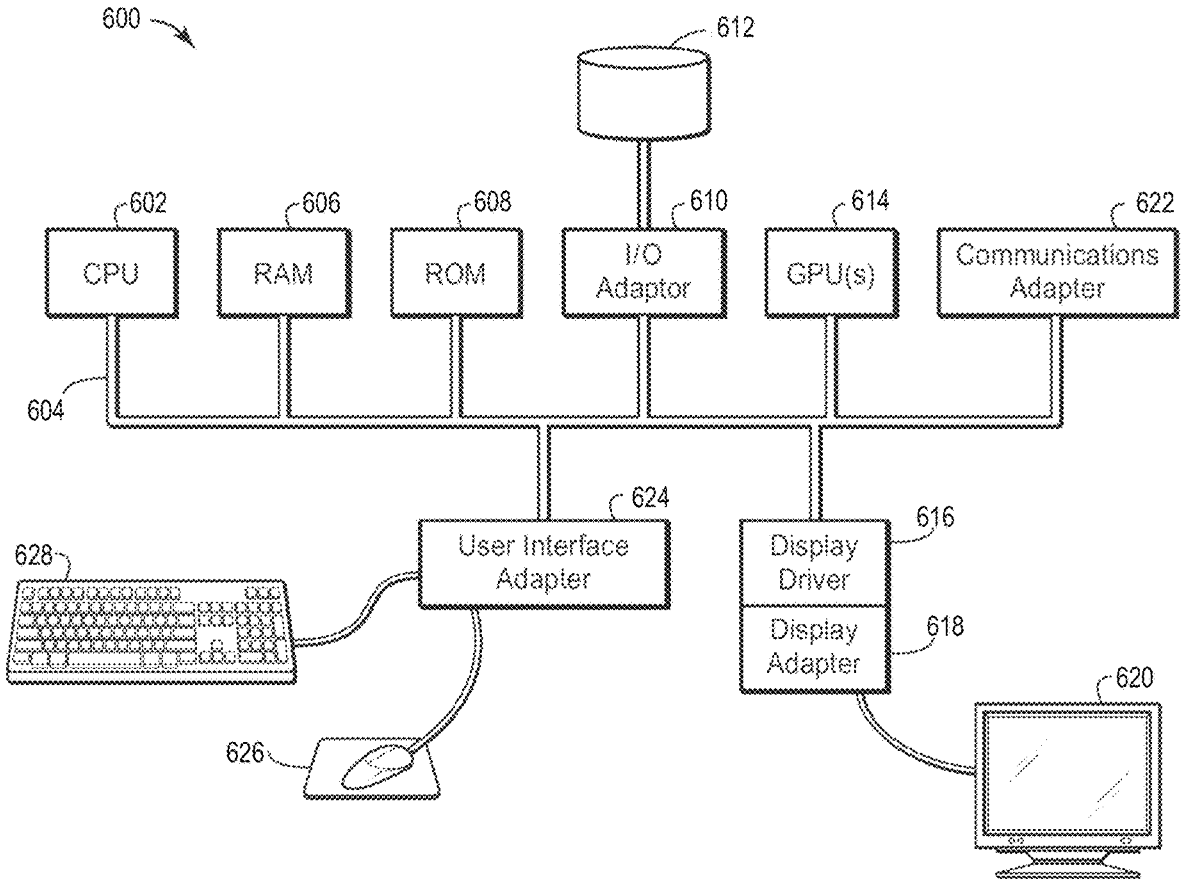
FIG. 6 is a diagram of an exemplary computer system that may be utilized to implement the methods described herein.

FIG. 6 is a diagram of an exemplary computer system 600 that may be utilized to implement methods, including the flow diagrams, described herein. A central processing unit (CPU) 602 is coupled to system bus 604. The CPU 602 may be any general-purpose CPU, although other types of architectures of CPU 602 (or other components of exemplary computer system 600) may be used as long as CPU 602 (and other components of computer system 600) supports the operations as described herein. Those of ordinary skill in the art will appreciate that, while only a single CPU 602 is shown in FIG. 6, additional CPUs may be present. Moreover, the computer system 600 may comprise a networked, multi-processor computer system that may include a hybrid parallel CPU/GPU system. The CPU 602 may execute the various logical instructions according to various teachings disclosed herein. For example, the CPU 602 may execute machine-level instructions for performing processing according to the operational flow described herein.

The computer system 600 may also include computer components such as non-transitory, computer-readable media. Examples of computer-readable media include computer-readable non-transitory storage media, such as a random-access memory (RAM) 606, which may be SRAM, DRAM, SDRAM, or the like. The computer system 600 may also include additional non-transitory, computer-readable storage media such as a read-only memory (ROM) 608, which may be PROM, EPROM, EEPROM, or the like. RAM 606 and ROM 608 hold user and system data and programs, as is known in the art. In this regard, computer-readable media may comprise executable instructions to perform any one, any combination, or all of the blocks in the flow charts in FIGS. 3-5 and 7. The computer system 600 may also include an input/output (I/O) adapter 610, a graphics processing unit (GPU) 614, a communications adapter 622 (e.g., a communication interface), a user interface adapter 624, a display driver 616, and a display adapter 618.

The I/O adapter 610 may connect additional non-transitory, computer-readable media such as storage device(s) 612, including, for example, a hard drive, a compact disc (CD) drive, a floppy disk drive, a tape drive, and the like to computer system 600. The storage device(s) may be used when RAM 606 is insufficient for the memory requirements associated with storing data for operations of the present techniques. The data storage of the computer system 600 may be used for storing information and/or other data used or generated as disclosed herein. For example, storage device(s) 612 may be used to store configuration information or additional plug-ins in accordance with the present techniques. Further, user interface adapter 624 couples user input devices, such as a keyboard 628, a pointing device 626 and/or output devices to the computer system 600. The display adapter 618 is driven by the CPU 602 to control the display on a display device 620 to, for example, present information to the user such as images generated according to methods described herein.

The architecture of computer system 600 may be varied as desired. For example, any suitable processor-based device may be used, including without limitation personal computers, laptop computers, computer workstations, and multiprocessor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 600 may include various plug-ins and library files. Input data may additionally include configuration information.

It is intended that the foregoing detailed description be understood as an illustration of selected forms that the invention can take and not as a definition of the invention. It is only the following claims, including all equivalents which are intended to define the scope of the claimed invention. Further, it should be noted that any aspect of any of the preferred embodiments described herein may be used alone or in combination with one another. Finally, persons skilled in the art will readily recognize that in preferred implementation, some, or all of the steps in the disclosed method are performed using a computer so that the methodology is computer implemented. In such cases, the resulting models discussed herein may be downloaded or saved to computer storage.

What is claimed is:

1. A direct current (DC) power system electrically connected to an alternating current (AC) grid, the DC power system comprising:

a common DC bus;

DC renewable power generation system electrically connected to the common DC bus;

DC energy storage system electrically connected to the common DC bus and configured to store energy provided by the DC renewable power generation system to the common DC bus;

a converter electrically connected to the common DC bus, the converter configured to convert DC power from the common DC bus to AC power for the AC grid; and DC renewable power generation control electronics associated with the DC renewable power generation system and configured to:

sense at least one deviation of at least one of power, current, or voltage of the common DC bus; and responsive to sensing the at least one deviation of the at least one of power, current, or voltage of the common DC bus, independently and without communicating with external control electronics, control in real-time power from the DC renewable power generation system in order to reduce the at least one deviation of the common DC bus; and DC energy storage control electronics associated with the DC energy storage system, separate from the DC renewable power generation control electronics, and configured to:

sense the at least one deviation of at least one of power, current, or voltage of the common DC bus; and responsive to sensing the at least one deviation of the at least one of power, current, or voltage of the common DC bus, independently and without communicating with external control electronics, control in real-time the power to or from the DC energy storage system in order to reduce the at least one deviation of the common DC bus, wherein the DC renewable power generation control electronics and the DC energy storage control electronics, responsive to sensing the at least one deviation, are configured to operate in decentralized control with the DC renewable power generation control electronics operating independently of and without communication with the DC energy storage control electronics and with the DC energy storage control electronics operating independently of and without communication with the DC renewable power generation control electronics.

2. The DC power system of claim 1, further comprising first DC-DC converter electronics configured to electrically connect the DC renewable power generation system to the common DC bus, wherein the DC renewable power generation control electronics is associated with or within the first DC-DC converter electronics;

further comprising second DC-DC converter electronics configured to electrically connect the DC energy storage system to the common DC bus, wherein the DC energy storage control electronics is associated with or within the second DC-DC converter electronics;

wherein the DC renewable power generation control electronics includes a first droop curve tailored to the first DC-DC converter electronics and is configured to use the first droop curve in order to control, without the communication with external electronic devices, in real-time the power from the DC renewable power generation system in order to reduce the at least one deviation of the common DC bus from a designated reference voltage; and wherein the DC energy storage control electronics includes a second droop curve and is configured to use the second droop curve tailored to the second DC-DC converter electronics in order to control, without the communication with external electronic devices, in real-time the power from or to the DC energy storage system in order to reduce the at least one deviation of the common DC bus from the designated reference voltage.

3. The DC power system of claim 2, wherein the DC renewable power generation system comprises a plurality of solar panels;

wherein the DC energy storage system comprises a plurality of batteries; and wherein the plurality of solar panels are segmented into respective partitions of solar panels, with each respective partition of solar panels having associated therewith respective DC-DC converter electronics and respective solar panel control electronics, each of the respective solar panel control electronics configured to use the first droop curve to independently and without communicating with other respective solar panel control electronics, control in real-time power from the respective partition of solar panels in order to reduce the at least one deviation of the common DC bus.

4. The DC power system of claim 3, wherein the plurality of batteries are segmented into respective partitions of batteries, with each respective partition of batteries having associated therewith respective DC-DC converter electronics and respective battery control electronics, each of the respective battery control electronics configured to use the second droop curve to independently and without communicating with other respective solar panel control electronics, control in real-time power to or from the respective partition of batteries in order to reduce the at least one deviation of the common DC bus.

5. The DC power system of claim 4, further comprising:

a plurality of loads, with each of the plurality of loads having associated therewith respective DC-DC converter electronics and respective battery control electronics, each of the respective battery control electronics configured to use a third droop curve to independently and without communicating with other respective battery control electronics, control in real-time power to a respective load in order to reduce the at least one deviation of the common DC bus.

6. The DC power system of claim 2, further comprising a droop update or reinterpretation module configured to update or reinterpret the one or both of the first droop curve or the second droop curve; and wherein the droop update or reinterpretation module is configured to dynamically update or reinterpret the one or both of the first droop curve or the second droop curve.

7. The DC power system of claim 6, wherein the droop update or reinterpretation module is configured dynamically update or reinterpret the one or both of the first droop curve or the second droop curve responsive to power generated by the DC renewable power generation system or power supplied by the DC energy storage system.

8. The DC power system of claim 6, further comprising a plurality of charging stations configured to charge one or more electric vehicles from one or both of DC renewable power generation system or the DC energy storage system; and wherein the droop update or reinterpretation module is configured dynamically update or reinterpret the one or both of the first droop curve or the second droop curve by:

dynamically determining an amount of power to route for charging the one or more electric vehicles; and dynamically updating or reinterpreting, based on the amount of power to route for charging the one or more electric vehicles, the one or both of the first droop curve or the second droop curve.

9. The DC power system of claim 6, wherein the droop update or reinterpretation module is configured to dynamically update or reinterpret the one or both of the first droop curve or the second droop curve by dynamically updating the designated reference voltage.

10. The DC power system of claim 9, further comprising at least one central controller configured to:

dynamically update or reinterpret the one or both of the first droop curve or the second droop curve by dynamically updating the designated reference voltage; and transmit the dynamically updated designated reference voltage with at least one of the DC energy storage control electronics or the DC energy storage control electronics in order for the at least one of the DC energy storage control electronics or the DC energy storage control electronics to independently control in real-time, the at least one of the DC energy storage control electronics or the DC energy storage control electronics to stabilize the common DC bus to the dynamically updated designated reference voltage.

11. The DC power system of claim 1, wherein, in real time, the DC renewable power generation control electronics and the DC energy storage control electronics operate independently to stabilize the common DC bus.

12. The DC power system of claim 1, wherein the DC renewable power generation control electronics and the DC energy storage control electronics operate independently to stabilize the common DC bus in a shorter-term; and further comprising at least one central controller configured to communicate with at least one of the DC energy storage control electronics or the DC energy storage control electronics in order to command, after the at least one of the DC energy storage control electronics or the DC energy storage control electronics independently controls in real-time, the at least one of the DC energy storage control electronics or the DC energy storage control electronics in order to further stabilize the common DC bus in a longer-term.

13. The DC power system of claim 12, wherein the at least one central controller is part of the DC energy storage control electronics or the DC energy storage control electronics.

14. The DC power system of claim 12, wherein the at least one central controller is configured to receive an indication of real-time generation from the DC renewable power generation system, real-time supply from the DC energy storage system, and real-time information on a plurality of loads in order to perform energy management by balancing energy available from the DC renewable power generation system and the DC energy storage system and to perform power management in order to balance a plurality of loads.

15. The DC power system of claim 14, wherein the plurality of loads comprise a plurality of charging stations configured to charge one or more electric vehicles from one or both of DC renewable power generation system or the DC energy storage system;

wherein the at least one central controller is configured to select, from a plurality of modes, a current mode of operation in which to control charging of the plurality of charging station under the current mode of operation.

16. The DC power system of claim 15, wherein the at least one central controller is configured to dynamically select the current mode based on one or more of grid operator input, input from a consumer of one of the plurality of charging stations, current status of electric vehicles currently charging at the plurality of charging stations, or current capacity of the electric vehicles currently charging at the plurality of charging stations; and wherein the at least one central controller is configured to dynamically select a pay-to-play mode in which a respective consumer, responsive to input indicating payment so that a respective electric vehicle of the respective consumer receives one or both of a higher charging priority or more power in which to charge the respective electric vehicle.

17. The DC power system of claim 1, wherein the DC renewable power generation control electronics and the DC energy storage control electronics operate independently in real time in no more than 15 microseconds.

18. The DC power system of claim 6, wherein the droop update or reinterpretation module is configured dynamically update or reinterpret the one or both of the first droop curve or the second droop curve responsive to real-time pricing changes in cost of electricity or changes in electricity demand.

19. The DC power system of claim 2, wherein the DC renewable power generation control electronics is configured to sense a change to the common DC bus and to respond to the change using the first droop curve tailored to the first DC-DC converter electronics; and wherein the DC energy storage control electronics is configured to sense the change to the common DC bus and to respond to the change using the second droop curve tailored to the second DC-DC converter electronics.

* * * * *